United States Patent
Miki et al.

(10) Patent No.: US 11,277,589 B2
(45) Date of Patent: Mar. 15, 2022

(54) IMAGE RECORDING SYSTEM

(71) Applicant: DENSO TEN Limited, Kobe (JP)

(72) Inventors: Yoshikuni Miki, Kobe (JP); Hiroshi Yamada, Kobe (JP); Hiroyuki Watabe, Kobe (JP); Yasuhiko Nakano, Düsseldorf (DE); Yuuji Uno, Düsseldorf (DE)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/010,038

(22) Filed: Sep. 2, 2020

(65) Prior Publication Data

US 2021/0067742 A1  Mar. 4, 2021

(30) Foreign Application Priority Data

Sep. 4, 2019  (JP) .............................. JP2019-161559

(51) Int. Cl.
*H04N 7/18* (2006.01)
*H04N 5/232* (2006.01)
*G07C 5/08* (2006.01)
*H04N 5/77* (2006.01)

(52) U.S. Cl.
CPC ........... *H04N 7/181* (2013.01); *G07C 5/0866* (2013.01); *G07C 5/0891* (2013.01); *H04N 5/232* (2013.01); *H04N 5/772* (2013.01)

(58) Field of Classification Search
CPC ........ H04N 7/181; H04N 5/772; H04N 5/232; G07C 5/0891; G07C 5/0866
See application file for complete search history.

(56) References Cited

U.S. PATENT DOCUMENTS

| | | | | |
|---|---|---|---|---|
| 8,867,853 | B2* | 10/2014 | Migdal ................ | G06Q 20/206 382/232 |
| 9,969,331 | B2* | 5/2018 | Huebner .................. | G06T 7/80 |
| 10,062,406 | B2* | 8/2018 | Park ................ | G11B 20/00478 |
| 2011/0043341 | A1* | 2/2011 | Kumagami ............... | B60R 1/00 340/425.5 |
| 2011/0145574 | A1* | 6/2011 | Ju ......................... | H04N 7/185 713/166 |
| 2013/0108105 | A1* | 5/2013 | Yoo ........................ | H04N 5/272 382/103 |
| 2018/0338231 | A1* | 11/2018 | Johnson ............. | G06K 9/00664 |
| 2018/0359449 | A1* | 12/2018 | Matsumoto ............ | G06T 7/215 |
| 2019/0057558 | A1* | 2/2019 | Gupta .................. | G08G 1/0129 |
| 2021/0004486 | A1* | 1/2021 | Adams ..................... | H04L 9/30 |

FOREIGN PATENT DOCUMENTS

JP         2019-032725 A      2/2019

* cited by examiner

*Primary Examiner* — Richard A Hansell, Jr.
(74) *Attorney, Agent, or Firm* — Oliff PLC

(57) ABSTRACT

A travel status recording apparatus records an image captured by a camera mounted on a vehicle, identifies personal information included in the captured image, and masks the personal information in the captured image. A server acquires a masked image corresponding to the captured image in which the personal information is masked from the travel status recording apparatus. The server determines, in response to a request from a third party, whether to restore the personal information included in the acquired masked image based on a preset restoration level. In a case where the server determines to restore the personal information, the server restores the personal information. In a case where the server determines not to restore the personal information, the server conceals the personal information.

2 Claims, 10 Drawing Sheets

FIG. 7

EVENT DETECTION INFORMATION 21
(SUDDEN DECELERATION)

```
DEVICE ID        : AEF9D
EVENT ID         : 123456
EVENT TYPE       : 4A (DETECTION OF SUDDEN DECELERATION)
DETECTION TIME   : 2019/8/26 13:45:2
DETECTION POSITION : N36 DEGREES 40 MINUTES XX SECONDS E135 DEGREES 10 MINUTES YY SECONDS
```

FIG. 9

RESTORATION DETERMINATION TABLE 39

| MANAGEMENT ID | DEVICE ID | VEHICLE INTERIOR IMAGE | FRONT IMAGE |
|---|---|---|---|
| 1 | AEF9D (TRAVEL STATUS RECORDING APPARATUS 10) | RESTORE | CONCEAL |
| 2 | K8U5R | CONCEAL | CONCEAL |
| 3 | 3SNU4 | RESTORE | CONCEAL |
| ⋮ | ⋮ | ⋮ | ⋮ |

IMAGE RECORDING SYSTEM

CROSS-REFERENCE TO RELATED APPLICATIONS

This application is based upon and claims the benefit of priority from prior Japanese patent application No. 2019-161559, filed on Sep. 4, 2019, the entire contents of which are incorporated herein by reference.

BACKGROUND

Technical Field

The present invention relates to an image recording system configured to record an image captured at a vehicle.

Related Art

A drive recorder is a travel status recording apparatus that records a captured image generated by a camera mounted on a vehicle. When the drive recorder is mounted on a truck, an operation manager of the truck may check whether a driver is driving the truck safely based on a captured image recorded in the drive recorder.

There is also provided a drive recorder that records not only an image captured by a vehicle exterior camera which is a front camera or the like but also an image captured by a camera that captures an image of a vehicle interior.

JP-A-2019-032725 discloses a drive recorder that detects an event which is sudden deceleration of a vehicle or the like. When an event has been detected, the drive recorder generates vehicle information indicating that the event occurs. The drive recorder compresses a moving image generated by a camera to generate low-resolution moving image data, and adds the vehicle information to a header of each frame included in the generated moving image data. The moving image data to which the vehicle information is added is transmitted to a server.

SUMMARY

A captured image recorded in the drive recorder may include personal information with which a person included in the captured image may be identified. From a viewpoint of personal information protection, the server may not provide moving image data received from the drive recorder to a third party.

In view of the above, an object of the present invention relates to an image recording system capable of disclosing a captured image recorded by a travel status recording apparatus to a third party.

According to the first aspect of the present invention, there is provided an image recording system including: a travel status recording apparatus configured to record an image that is captured by at least one camera mounted on a vehicle; and a server configured to communicate with the travel recording apparatus. The travel status recording apparatus includes a personal information identification unit configured to identify personal information included in the captured image, and a mask unit configured to, in a case where the personal information identification unit identifies the personal information in the captured image, mask the personal information in the captured image in a restorable manner. The server includes an acquisition unit configured to acquire a masked image from the travel status recording apparatus, the masked image corresponding to the captured image in which the personal information is masked by the mask unit, a restoration determination unit configured to determine, in response to a request for the masked image acquired by the acquisition unit from a third party, whether to restore the personal information included in the acquired masked image based on a preset restoration level, and an image provision unit configured to, in a case where the restoration determination unit determines to restore the personal information, restore the personal information included in the acquired masked image, and provide the third party with a masked image in which the personal information the restoration determination unit has determined to restore is restored, and, in a case where the restoration determination unit determines not to restore the personal information, conceal the personal information included in the acquired masked image, and provide the third party with a masked image in which the personal information the restoration determination unit has determined not to restore is concealed.

According to the first aspect, in a case where an image captured by the camera mounted on the vehicle includes personal information with which an individual is identified, it may be possible to provide the captured image to a third party such that the personal information included in the captured image is not known by the third party.

According to the second aspect of the present invention, there is provided the image recording system according to the first aspect of the present invention, in which the at least one camera includes a front camera configured to capture an image of a scene in front of the vehicle, and a vehicle interior camera configured to capture an image of a vehicle interior of the vehicle, in a case where the acquired masked image is generated by the front camera, the restoration determination unit determines not to restore the personal information included in the acquired masked image, and, in a case where the acquired masked image is generated by the vehicle interior camera, the restoration determination unit determines whether to restore the personal information included in the acquired masked image based on presence or absence of approval by an owner of the vehicle.

According to the second aspect, it may be possible to determine whether to restore a mask applied to a vehicle interior image based on the presence or absence of approval by the owner of the vehicle.

According to the aspects of the present invention, it may be possible to provide an image recording system capable of disclosing a captured image recorded by a travel status recording apparatus to a third party.

BRIEF DESCRIPTION OF DRAWINGS

FIG. 7 shows an example of event detection information generated by an event detection unit shown in FIG. 2.

FIG. 9 shows an example of a restoration determination table that is referred to by a restoration determination unit shown in FIG. 3.

DESCRIPTION OF EMBODIMENTS

Figure 1:
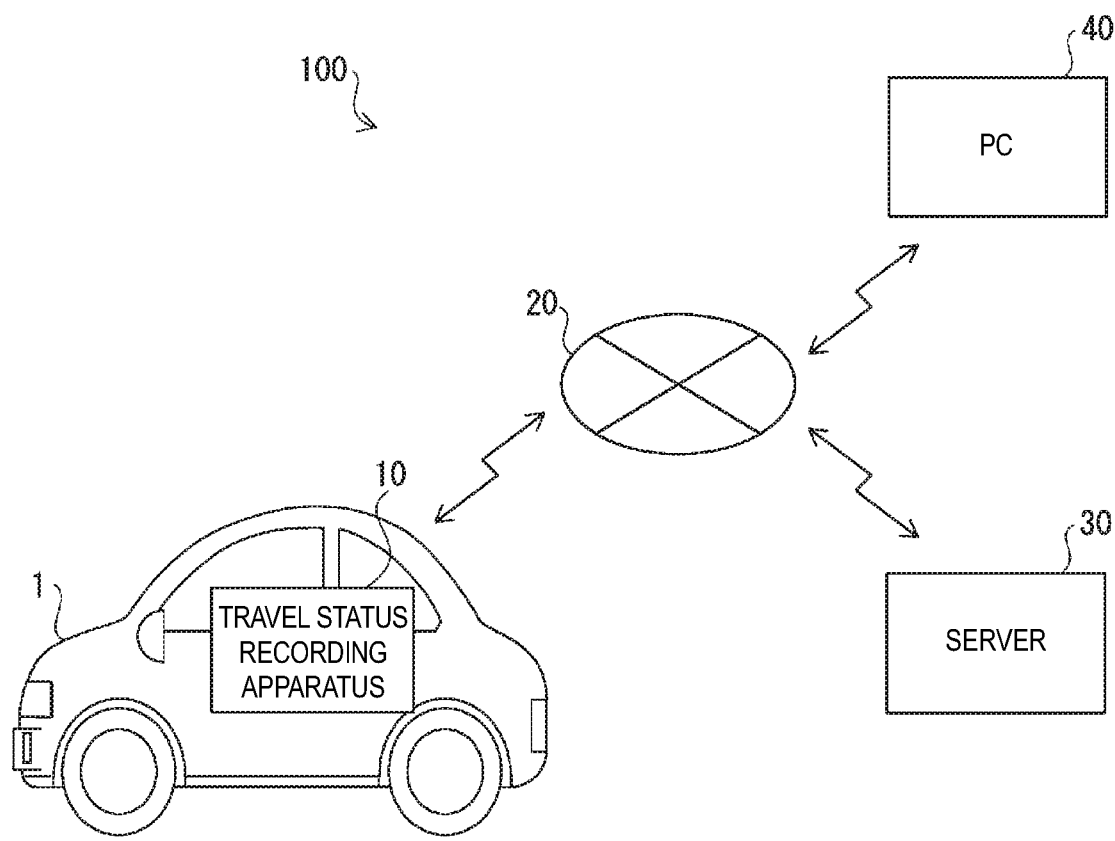
FIG. 1 is a functional block diagram showing a configuration of an image recording system according to an embodiment of the present invention.

Hereinafter, embodiments of the present invention will be described in detail with reference to the drawings. In the drawings, the same or equivalent parts are denoted by the same reference numerals, and the description thereof will not be repeated.

[1. Configuration of Image Recording System 100]

FIG. 1 is a functional block diagram showing a configuration of an image recording system 100 according to an embodiment. The image recording system 100 includes a travel status recording apparatus 10, a network 20, a server 30, and PC (Personal Computer) 40. The travel status recording apparatus 10 is mounted on a vehicle 1 which is an automobile or the like, and is configured to record a travel status of the vehicle 1. The travel status recording apparatus 10 communicates with the server 30 via the network 20. In response to a request from the server 30, the travel status recording apparatus 10 transmits an image capturing a travel status of the vehicle 1 to the server 30. The server may communicate with the vehicle 1.

The network 20 is a wide area network which is the Internet or the like. The travel status recording apparatus 10 accesses the network 20 using wireless communication. A wireless communication system is, for example, long term evolution (LTE) or a fifth generation mobile communication system.

The server 30 acquires an image that is captured by a camera mounted on the vehicle 1 from the travel status recording apparatus 10.

The PC 40 is a terminal that is operated by a third party unrelated to an owner of the vehicle 1. The PC 40 acquires, from the server 30, an image obtained by capturing a travel status of the vehicle 1 in response to operation of the third party.

[2. Device Mounted on Vehicle 1]

Figure 2:
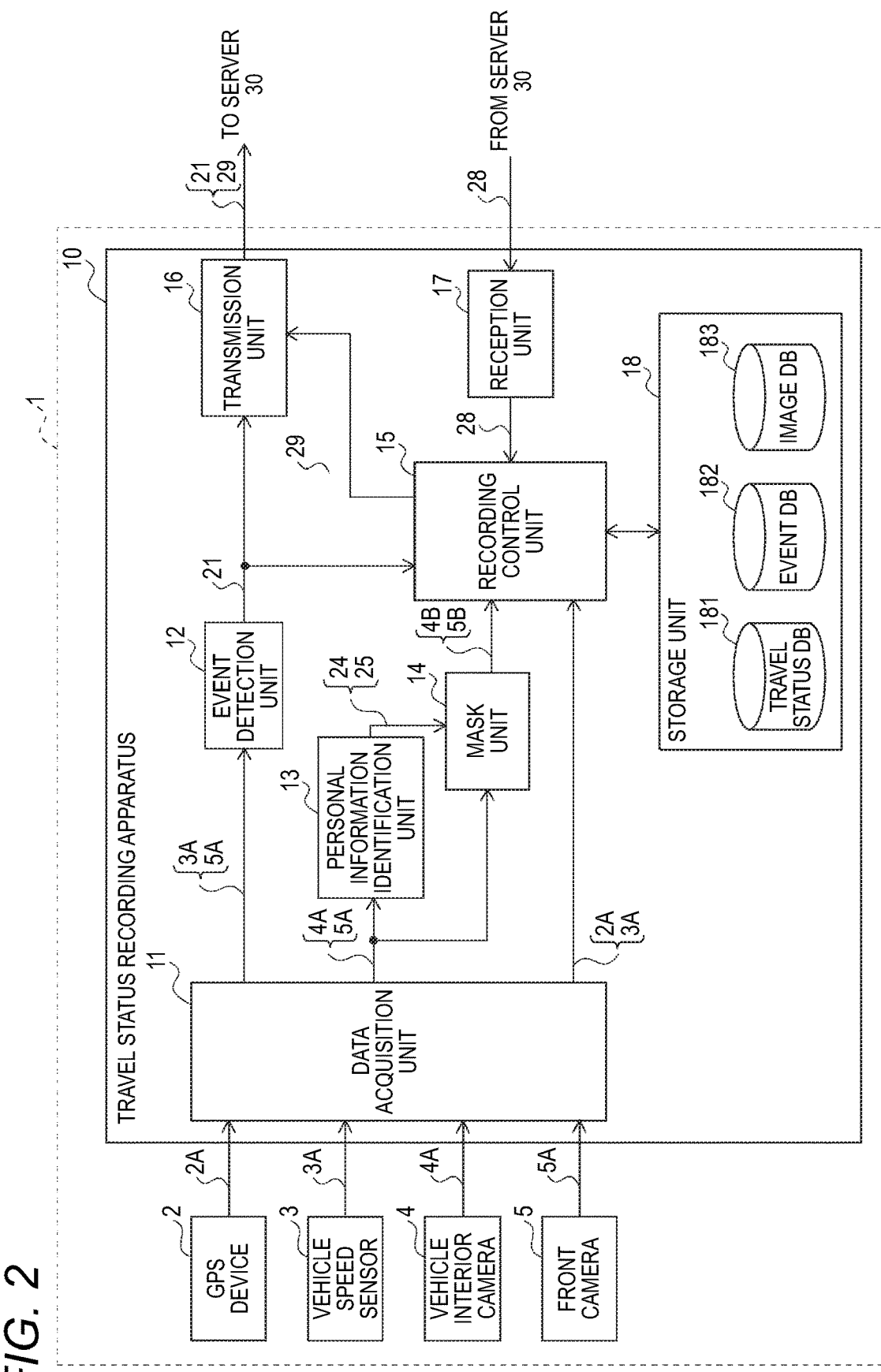
FIG. 2 is a functional block diagram showing a configuration of a travel status recording apparatus shown in FIG. 1.

FIG. 2 is a functional block diagram showing a configuration of the travel status recording apparatus 10 shown in FIG. 1. With reference to FIG. 2, the travel status recording apparatus 10 is configured to record output from various devices mounted on the vehicle 1 as travel status data indicating a travel status of the vehicle 1. The various devices acquire a travel status of the vehicle 1, and in the present embodiment, are a global positioning system (GPS) device 2, a vehicle speed sensor 3, a vehicle interior camera 4, and a front camera 5.

The GPS device 2 is configured to receive a signal from a GPS satellite, and to identify a current position 2A of the vehicle 1 based on the received signal. Each time identifying the current position 2A, the GPS device 2 outputs the identified current position 2A to a data acquisition unit 11 of the travel status recording apparatus 10.

The vehicle speed sensor 3 is configured to measure a rotation amount of a drive wheel of the vehicle 1 per unit time, and to output the measured rotation amount to the data acquisition unit 11 as vehicle speed information 3A.

The vehicle interior camera 4 is attached to, for example, a rearview mirror of the vehicle 1, and is configured to image a vehicle interior of the vehicle 1 including a driver seat. Therefore, the vehicle interior camera 4 images a driver of the vehicle 1. The vehicle interior camera 4 generates a vehicle interior image 4A and outputs the generated vehicle interior image 4A to the data acquisition unit 11. The vehicle interior image 4A is a frame of a moving image.

The front camera 5 is attached to a front end surface of the vehicle 1, and is configured to image a scene in front of the vehicle 1 to generate a front image 5A. A mounting position of the front camera 5 is not limited as long as the front camera 5 may image a scene in front of the vehicle 1. The front camera 5 outputs the front image 5A generated to the data acquisition unit 11. The front image 5A is a frame of a moving image.

The vehicle interior image 4A may include a face of a person riding on the vehicle 1. The front image 5A may include a pedestrian, a bicycle, or a license plate of a vehicle. That is, the vehicle interior image 4A and the front image 5A include personal information with which an individual may be identified. In the following description, the vehicle interior image 4A and the front image 5A may be collectively referred to as a "captured image".

[3. Configuration of Travel Status Recording Apparatus 10]

With reference to FIG. 2, the travel status recording apparatus 10 includes the data acquisition unit 11, an event detection unit 12, a personal information identification unit 13, a mask unit 14, a recording control unit 15, a transmission unit 16, a reception unit 17, and a storage unit 18.

The data acquisition unit 11 is configured to acquire the current position 2A, the vehicle speed information 3A, the vehicle interior image 4A, and the front image 5A from various devices mounted on the vehicle 1 as travel status data.

The data acquisition unit 11 outputs the vehicle speed information 3A and the front image 5A of the acquired travel status data to the event detection unit 12. The data acquisition unit 11 outputs the vehicle interior image 4A and the front image 5A of the acquired travel status data to the personal information identification unit 13 and the mask unit 14. The data acquisition unit 11 outputs the current position 2A and the vehicle speed information 3A of the acquired travel status data to the recording control unit 15.

The event detection unit 12 is configured to detect an event using the vehicle speed information 3A and the front image 5A received from the data acquisition unit 11. Artificial intelligence is used to detect an event. The event is a specific travel status that occurs at the vehicle 1, and in the present embodiment, is sudden deceleration of the vehicle 1 and detection of a falling object. The vehicle speed information 3A is used to detect sudden deceleration of the vehicle 1. The front image 5A is used to detect a falling object. The event detection unit 12 outputs event detection information 21 indicating a detection result of an event to the recording control unit 15 and the transmission unit 16.

The personal information identification unit 13 is configured to receive the vehicle interior image 4A and the front image 5A from the data acquisition unit 11, and to identify a region including personal information in each of the received vehicle interior image 4A and the received front image 5A. The personal information identification unit 13 outputs, to the mask unit 14, region information 24 that indicates a region including the personal information in the vehicle interior image 4A and region information 25 that indicates a region including the personal information in the front image 5A.

The mask unit 14 is configured to mask the personal information included in each of the vehicle interior image 4A and the front image 5A that are received from the data acquisition unit 11 in a restorable manner such that the personal information may be restored. Specifically, the mask unit 14 masks the region including the personal information in the received vehicle interior image 4A based on the region information 24 received from the personal information identification unit 13 to generate a masked vehicle interior image 4B. The mask unit 14 masks the region including the personal information in the received front image 5A based on the region information 25 received from the personal information identification unit 13 to generate a masked front image 5B. The mask unit 14 outputs the generated masked vehicle interior image 4B and the generated masked front image 5B to the recording control unit 15.

In the following description, the masked vehicle interior image 4B and the masked front image 5B may be collectively referred to as a "masked image".

The recording control unit 15 is configured to record various types of information in a database provided in the storage unit 18. Specifically, the recording control unit 15 records the current position 2A and the vehicle speed information 3A that are received from the data acquisition unit 11 in a travel status database (DB) 181 provided in the storage unit 18. The recording control unit 15 records the event detection information 21 received from the event detection unit 12 in an event DB 182 provided in the storage unit 18. The recording control unit 15 records the masked image received from the mask unit 14 in an image DB 183 provided in the storage unit 18.

When receiving a transmission request 28 issued by the server 30 from the reception unit 17, the recording control unit 15 reads out the masked image from the image DB 183 based on the received transmission request 28. The recording control unit 15 generates response data 29 including the read masked image, and outputs the generated response data 29 to the transmission unit 16.

When receiving the event detection information 21 from the event detection unit 12, the transmission unit 16 transmits the received event detection information 21 to the server 30. The transmission unit 16 is configured to transmit the received response data 29 to the server 30 when receiving the response data 29 from the recording control unit 15.

When receiving the transmission request 28 from the server 30, the reception unit 17 outputs the received transmission request 28 to the recording control unit 15.

The storage unit 18 is a non-volatile storage device, for example, a hard disk drive (HDD) or a flash memory. The storage unit 18 includes the travel status DB 181, the event DB 182, and the image DB 183.

[4. Configuration of Server 30]

Figure 3:
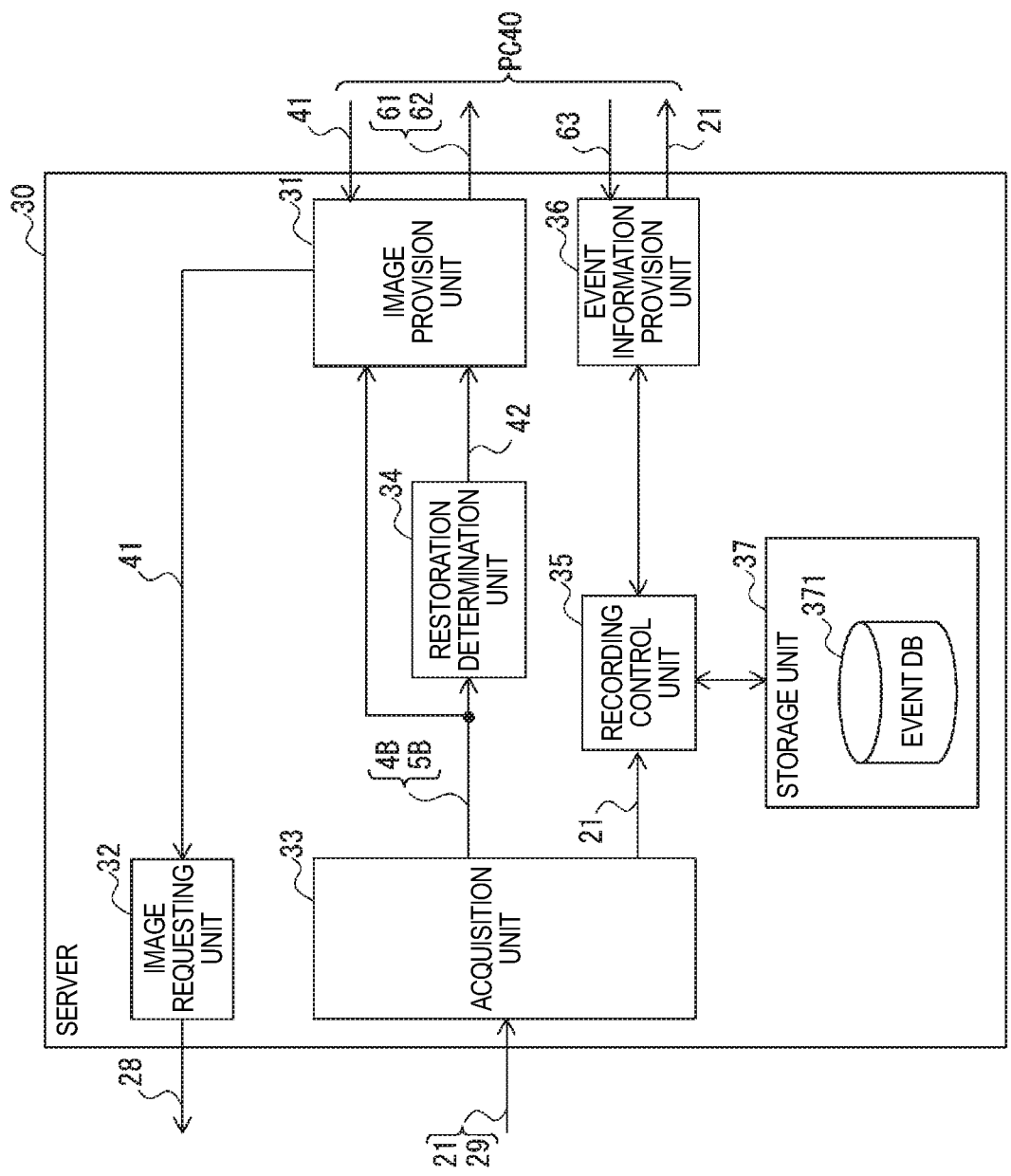
FIG. 3 is a functional block diagram showing a configuration of a server shown in FIG. 1.

FIG. 3 is a functional block diagram showing a configuration of the server 30 shown in FIG. 1. With reference to FIG. 3, the server 30 includes an image provision unit 31, an image requesting unit 32, an acquisition unit 33, a restoration determination unit 34, a recording control unit 35, an event information provision unit 36, and a storage unit 37.

When receiving an image provision request 41 from the PC 40, the image provision unit 31 outputs the received image provision request to the image requesting unit 32. The image provision request 41 includes information for identifying the vehicle 1 and conditions of an image desired to be provided. The conditions of an image are, for example, an image capturing time and an image capturing position.

The image provision unit 31 receives the masked vehicle interior image 4B and the masked front image 5B from the acquisition unit 33 and receives a determination result 42 from the restoration determination unit 34. The determination result 42 is information indicating whether to restore the personal information included in the masked vehicle interior image 4B and the masked front image 5B.

When the determination result 42 indicates restoration of the personal information, the image provision unit 31 generates a restored image 61 by releasing the personal information included in the masked image. The image provision unit 31 transmits the restored image 61 to the PC 40. The restored image 61 includes at least one of the masked vehicle interior image 4B and the masked front image 5B in which the personal information is restored.

When the determination result 42 does not indicate restoration of the personal information, the image providing unit 31 conceals the personal information included in the masked vehicle interior image 4B and the masked front image 5B such that the personal information may not be restored. As a result, a concealed image 62 is generated. The image provision unit 31 transmits the generated concealed image 62 to the PC 40. The concealed image 62 includes at least one of the vehicle interior image 4A and the front image 5A in which the personal information is concealed.

When receiving the image provision request 41 from the image provision unit 31, the image requesting unit 32 generates the transmission request 28 based on the received image provision request 41. The image requesting unit 32 transmits the generated transmission request 28 to the travel status recording apparatus 10.

When receiving the response data 29 from the travel status recording apparatus 10, the acquisition unit 33 outputs the masked vehicle interior image 4B and the masked front image 5B that are included in the received response data 29 to the image provision unit 31 and the restoration determination unit 34. When receiving the event detection information 21 from the travel status recording apparatus 10, the acquisition unit 33 outputs the received event detection information 21 to the recording control unit 35.

When receiving the masked vehicle interior image 4B and the masked front image 5B from the acquisition unit 33, the restoration determination unit 34 determines whether to restore the personal information included in the masked vehicle interior image 4B and the masked front image 5B based on a preset restoration level. The restoration determination unit 34 outputs the determination result 42 indicating whether to restore the personal information to the image provision unit 31.

When receiving the event detection information 21 from the acquisition unit 33, the recording control unit 35 stores the received event detection information 21 in an event DB 371. When instructed to read out the event detection information 21 from the event information provision unit 36, the recording control unit 35 reads out the event detection information 21 from the event DB 371 and outputs the event detection information 21 to the event information provision unit 36.

When receiving an event information request 63 from the PC 40, the event information provision unit 36 instructs the recording control unit 35 to read out the event detection information 21 according to a condition designated in the event information request 63. The event information provision unit 36 transmits the event detection information 21 received from the recording control unit 35 to the PC 40.

The storage unit 37 is a non-volatile storage device, for example, is an HDD or a flash memory.

[5. Operation]

[5.1. Operation of Image Recording System 100]

Figure 4:
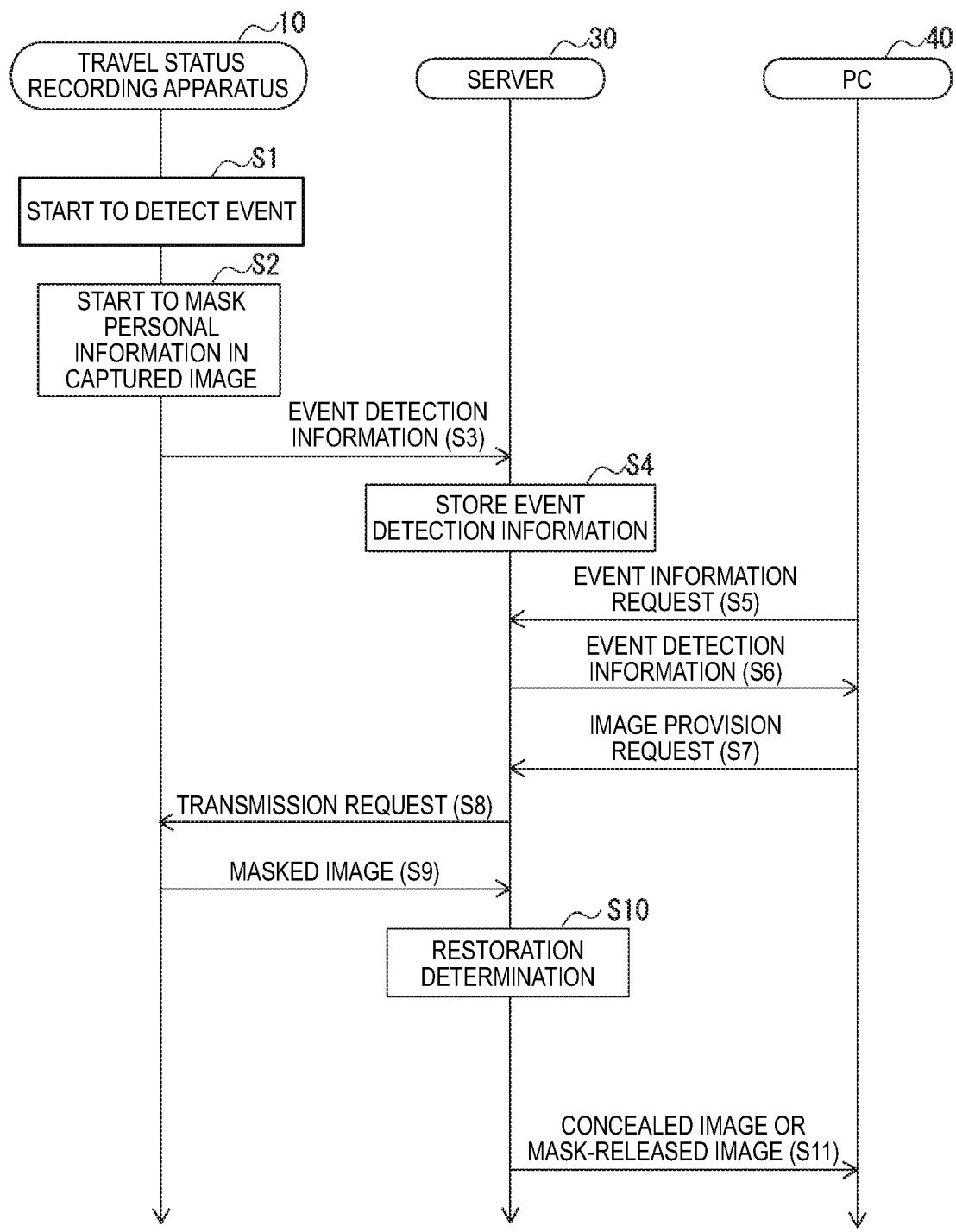
FIG. 4 is a sequence diagram showing operation of the image recording system shown in FIG. 1.

FIG. 4 is a sequence diagram showing operation of the image recording system 100 shown in FIG. 1. The overall operation of the image recording system 100 will be described below with reference to FIG. 4. FIG. 4 shows an outline of operation of each device, and does not show detailed operation of each device.

When an ignition switch (not shown) of the vehicle 1 is turned on, the travel status recording apparatus 10 starts to detect an event (step S1).

When the ignition switch (not shown) of the vehicle 1 is turned on, the travel status recording apparatus 10 starts to mask personal information included in a captured image (step S2). Each time acquiring a captured image from each of the vehicle interior camera 4 and the front camera 5, the travel status recording apparatus 10 masks personal information included in the acquired captured image to generate a masked image. The generated masked image is stored in the image DB 183. Details of the masking of the personal information included in the captured image will be described later.

When detecting an event, the travel status recording apparatus 10 transmits the event detection information 21 indicating a detection result of the event to the server 30 (step S3). The server 30 stores the event detection information 21 received from the travel status recording apparatus 10 in the event DB 371 (step S4). Steps S3 and S4 are repeated each time the travel status recording apparatus 10 detects an event.

As described above, the PC 40 is operated by the third party unrelated to the owner of the vehicle 1. The third party is, for example, a road administrator who manages a highway, a national road, or the like. When checking a travel status of a vehicle at a frequent occurrence point of sudden deceleration, the road administrator operates the PC 40 to instruct transmission of the event detection information 21 in which sudden deceleration at the frequent occurrence point is recorded. The PC 40 transmits the event information request 63 to the server 30 in response to operation of the third party (step S5).

The server 30 reads out, from the event DB 371, the event detection information 21 corresponding to the event information request 63 received from the PC 40, and transmits the read event detection information 21 to the PC 40 (step S6). The read event detection information 21 is transmitted in step S6. The number of pieces of the event detection information 21 is not limited to one.

The PC 40 selects any one piece of the event detection information 21 received from the server 30 in response to operation of the third party. The PC 40 transmits the image provision request 41 to the server 30 based on the selected event detection information 21 (step S7).

When receiving the image provision request 41 from the PC 40, the server 30 generates the transmission request 28 based on the received image provision request 41, and transmits the generated transmission request 28 to the travel status recording apparatus 10 (step S8).

The travel status recording apparatus 10 reads out, from the image DB 183, the masked image corresponding to the transmission request 28 received from the server 30. The travel status recording apparatus 10 transmits the response data 29 including the read masked image to the server 30 (Step S9).

When receiving the response data 29 from the travel status recording apparatus 10, the server 30 determines whether to restore the personal information in the masked image included in the received response data 29 (step S10). As will be described later in detail, the server 30 determines not to restore the personal information included in the masked front image 5B of the masked images. The server 30 determines whether to restore the personal information included in the masked vehicle interior image 4B of the masked images based on a restoration level preset by the owner of the vehicle 1.

When the personal information of the masked image is not restored, the server 30 conceals the personal information included in the masked image such that the personal information included in the masked image may not be restored. As a result, the concealed image 62 is generated. When the personal information of the masked image is restored, the server 30 releases the mask set in the masked image to generate the restored image 61 in which the mask of the personal information is released. The server 30 transmits the response data 29 including the generated restored image 61 and the generated concealed image 62 to the PC 40 (step S11).

[5.2. Operation of Travel Status Recording Apparatus 10]

Figure 5:
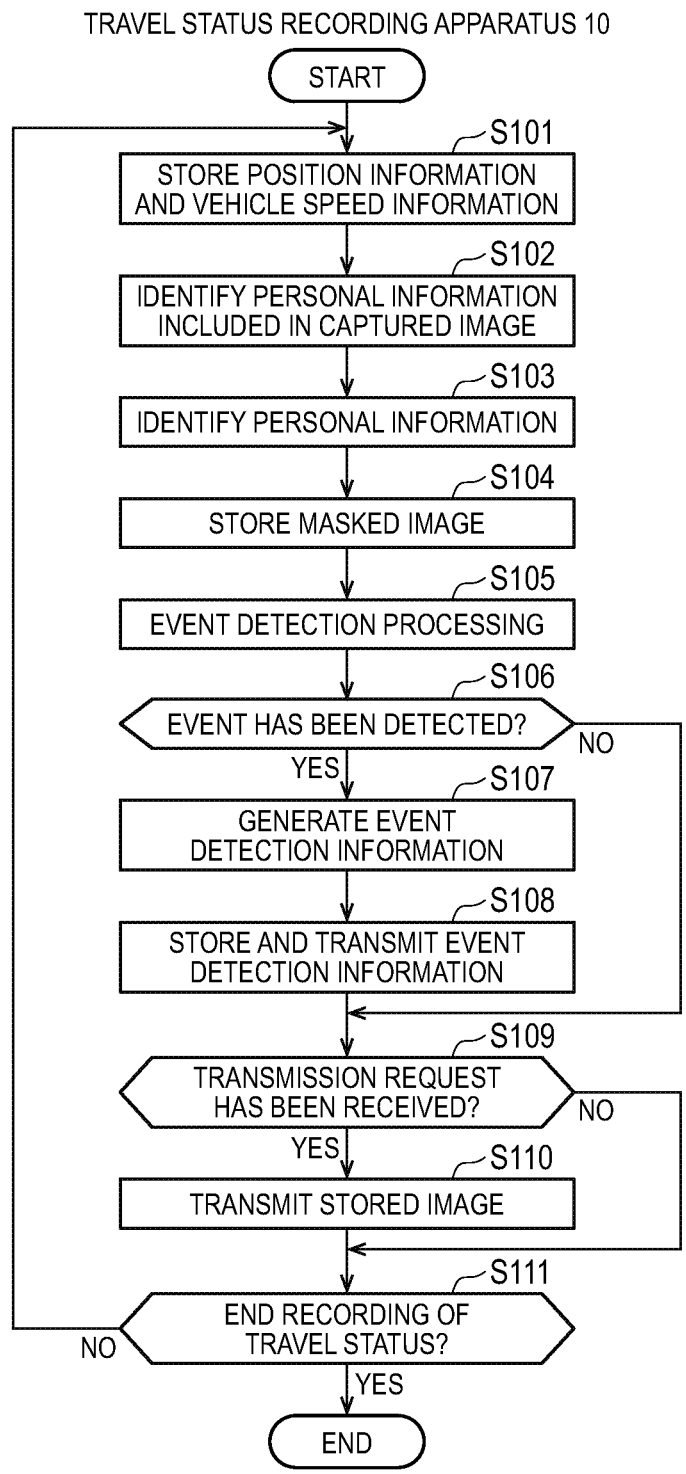
FIG. 5 is a flowchart showing operation of the travel status recording apparatus shown in FIG. 1.

FIG. 5 is a flowchart showing operation of the travel status recording apparatus 10 shown in FIG. 1. With reference to FIG. 5, when the ignition switch (not shown) of the vehicle 1 is turned on, the travel status recording apparatus 10 starts processing shown in FIG. 5.

In the travel status recording apparatus 10, the recording control unit 15 stores the current position 2A and the vehicle speed information 3A that are acquired by the data acquisition unit 11 in the travel status DB 181 (step S101).

The personal information identification unit 13 identifies the personal information included in each of the vehicle interior image 4A and the front image 5A that are acquired by the data acquisition unit 11 (step S102).

Figure 6A:
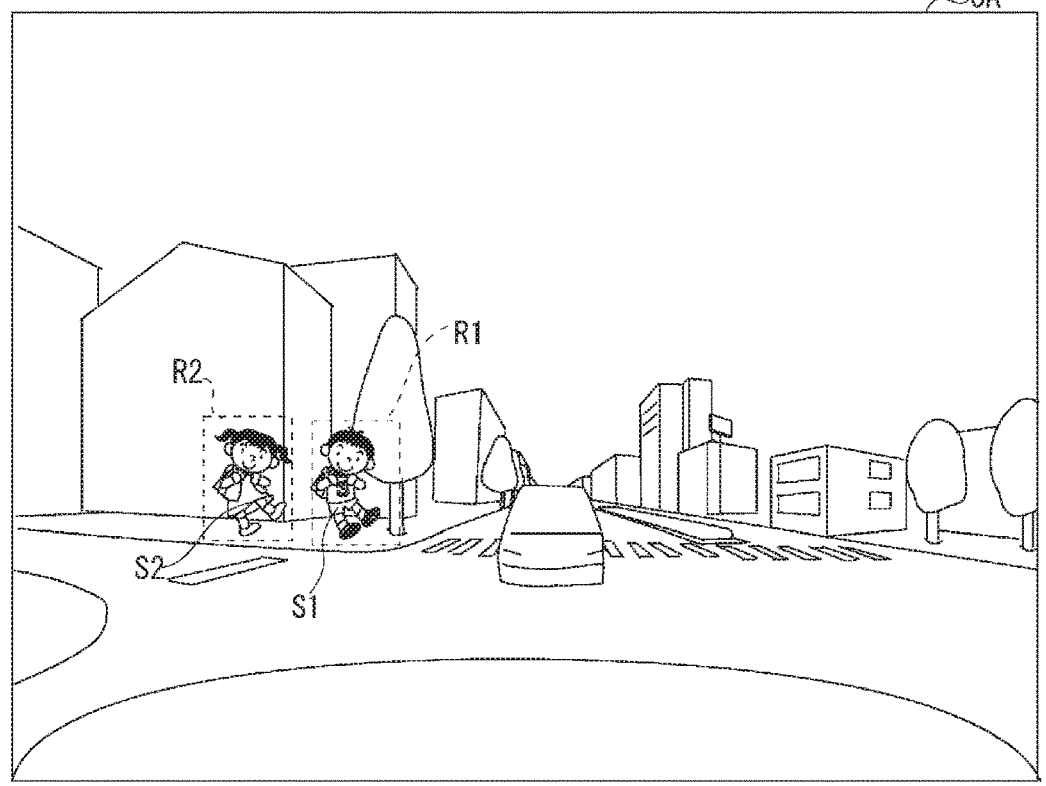
FIG. 6A shows an example of a front image that is generated by a front camera shown in FIG. 2.

FIG. 6A shows an example of the front image 5A that is generated by the front camera 5 shown in FIG. 2. The personal information identification unit 13 executes image recognition processing for detecting a pedestrian, and detects pedestrians S1 and S2 from the front image 5A shown in FIG. 6A. The personal information identification unit 13 identifies a detection region R1 of the pedestrian S1 and a detection region R2 of the pedestrian S2. The personal information identification unit 13 generates information indicating the identified detection regions R1 and R2 as the region information 25.

When identifying the personal information included in the front image 5A, the personal information identification unit 13 may detect a bicycle from the front image 5A. In this case, the region information 25 includes information indicating a detection region of the bicycle. When identifying the personal information included in the front image 5A, the personal information identification unit 13 may detect a license plate of a vehicle. In this case, the region information 25 includes a detection region of the license plate.

When identifying the personal information included in the vehicle interior image 4A, the personal information identification unit 13 executes image recognition processing to detect a face of a person. The personal information identification unit 13 generates information indicating a region of the detected face of the person as the region information 24.

With reference to FIG. 5, the mask unit 14 masks the personal information identified in step S102, which is the personal information included in each of the vehicle interior image 4A and the front image 5A that are acquired by the data acquisition unit 11 (step S103). As a result of step S103, the masked image is generated.

Figure 6B:
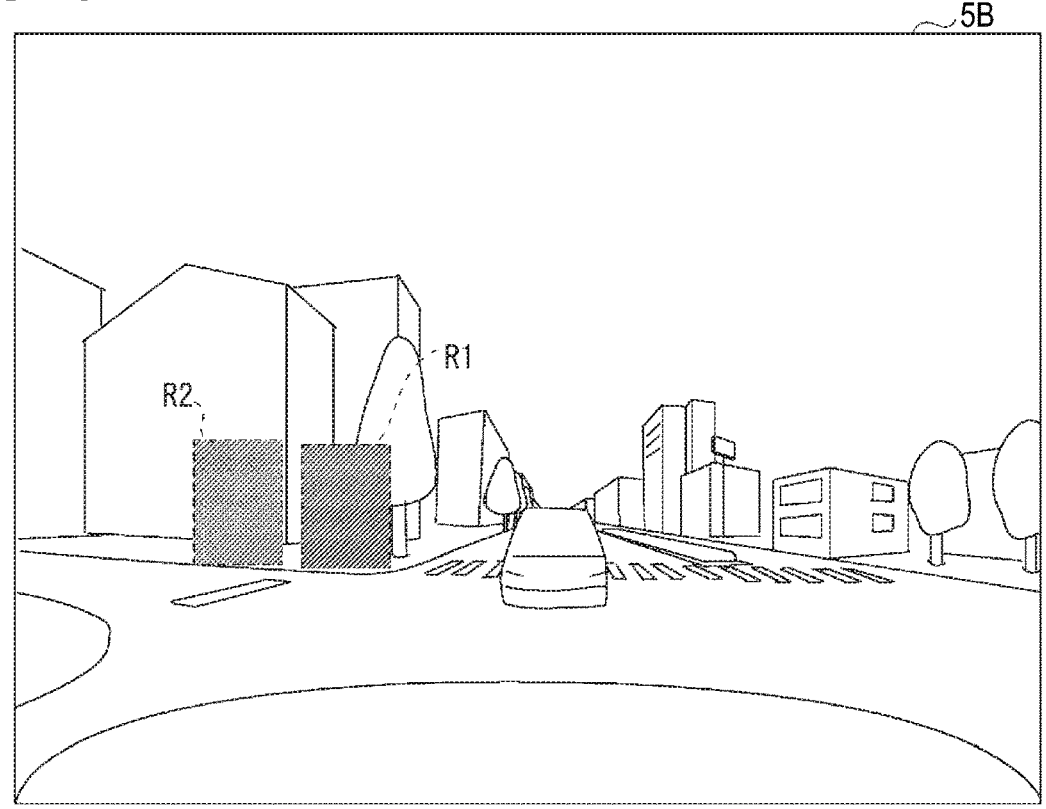
FIG. 6B shows an example of a masked front image generated based on the front image shown in FIG. 6A.

Step S103 will be described in detail by taking as an example in which the personal information included in the front image 5A shown in FIG. 6A is masked. The mask unit 14 generates a mask layer having the same size as the front image 5A, and provides the generated mask layer on the front image 5A. The mask layer is transparent. The mask unit 14 fills the detection regions R1 and R2 indicated by the acquired region information 24 with black in the transparent layer provided on the front image 5A. As a result, the masked front image 5B is generated from the front image 5A. In the masked front image 5B shown in FIG. 6B, hatched regions are the regions filled with black. The pedestrians S1 and S2 may be restored by deleting the mask layer from the masked front image 5B. That is, the masked front image 5B includes the front image 5A and the mask layer.

Similarly to the generation of the masked front image 5B, the mask unit 14 generates the masked vehicle interior image 4B from the vehicle interior image 4A. The masked vehicle interior image 4B includes the vehicle interior image 4A and a mask layer.

With reference to FIG. 5, the recording control unit 15 stores the masked image generated in step S103 in the image DB 183 in association with an image capturing time (step S104). When the personal information is not identified in the vehicle interior image 4A and the front image 5A, the vehicle interior image 4A and the front image 5A are stored in the image DB 183 after being associated with image capturing times.

The event detection unit 12 detects an event that occurs at the vehicle 1 using the vehicle speed information 3A and the front image 5A that are acquired by the data acquisition unit 11 (step S105). Specifically, the event detection unit 12 detects sudden deceleration of the vehicle 1 based on a temporal change of the acquired vehicle speed information 3A. The event detection unit 12 executes image recognition processing to detect a falling object on a road from the front image 5A.

When an event has been detected (Yes in step S106), the event detection unit 12 generates the event detection information 21 (step S107). If no event has been detected (No in step S106), the travel status recording apparatus 10 proceeds to step S109 (described later).

FIG. 7 shows an example of the event detection information 21 generated by the event detection unit 12 shown in FIG. 2. With reference to FIG. 7, the event detection information 21 includes a device ID, an event ID, an event type, a detection time, and a detection position. The device ID is identification information for uniquely identifying the travel status recording apparatus 10. The event ID is identification information uniquely assigned to the event detection information 21. The event type is information for specifying a detected event. As described above, when sudden deceleration of the vehicle 1 has been detected, the event type is "4A". The detection time is a time at which sudden deceleration is detected. The detection position indicates a position at which sudden deceleration is detected, and is described based on the current position 2A.

The event detection information 21 generated in step S107 is stored and transmitted (step S108). Specifically, the recording control unit 15 stores the generated event detection information 21 in the event DB 182. The transmission unit 16 transmits the generated event detection information 21 to the server 30. Step S107 corresponds to step S3 shown in FIG. 4.

Next, the recording control unit 15 determines whether the transmission request 28 has been received from the server 30 (step S109). If the transmission request 28 has not been received (No in step S109), the travel status recording apparatus 10 proceeds to step S111 (described later). When the transmission request 28 has been received (Yes in step S109), the travel status recording apparatus 10 transmits an image designated based on the transmission request 28 among images stored in the image DB to the server 30 (step S110). Step S110 corresponds to step S9 shown in FIG. 4.

Step S110 will be described in detail. The transmission request 28 includes the event ID described in the event detection information 21. The recording control unit 15 reads out the event detection information 21 corresponding to the event ID included in the transmission request 28 from the event DB 182, and identifies the detection time recorded in the read event detection information 21. The recording control unit 15 reads out an image captured at predetermined time including the identified detection time from the image DB 183, and generates the response data 29 including the read image. The predetermined time is, for example, one minute. The recording control unit 15 transmits the generated response data 29 to the server 30.

When the ignition switch remains on, the travel status recording apparatus 10 determines to continue recording of a travel status of the vehicle 1 (No in step S111). In this case, the travel status recording apparatus 10 returns to step S101. When the ignition switch is changed from on to off, the travel status recording apparatus 10 determines to end the recording of a travel status of the vehicle 1 (Yes in Step S111). In this case, the travel status recording apparatus 10 ends the processing shown in FIG. 5.

[5.3. Operation of Server 30]

Figure 8:
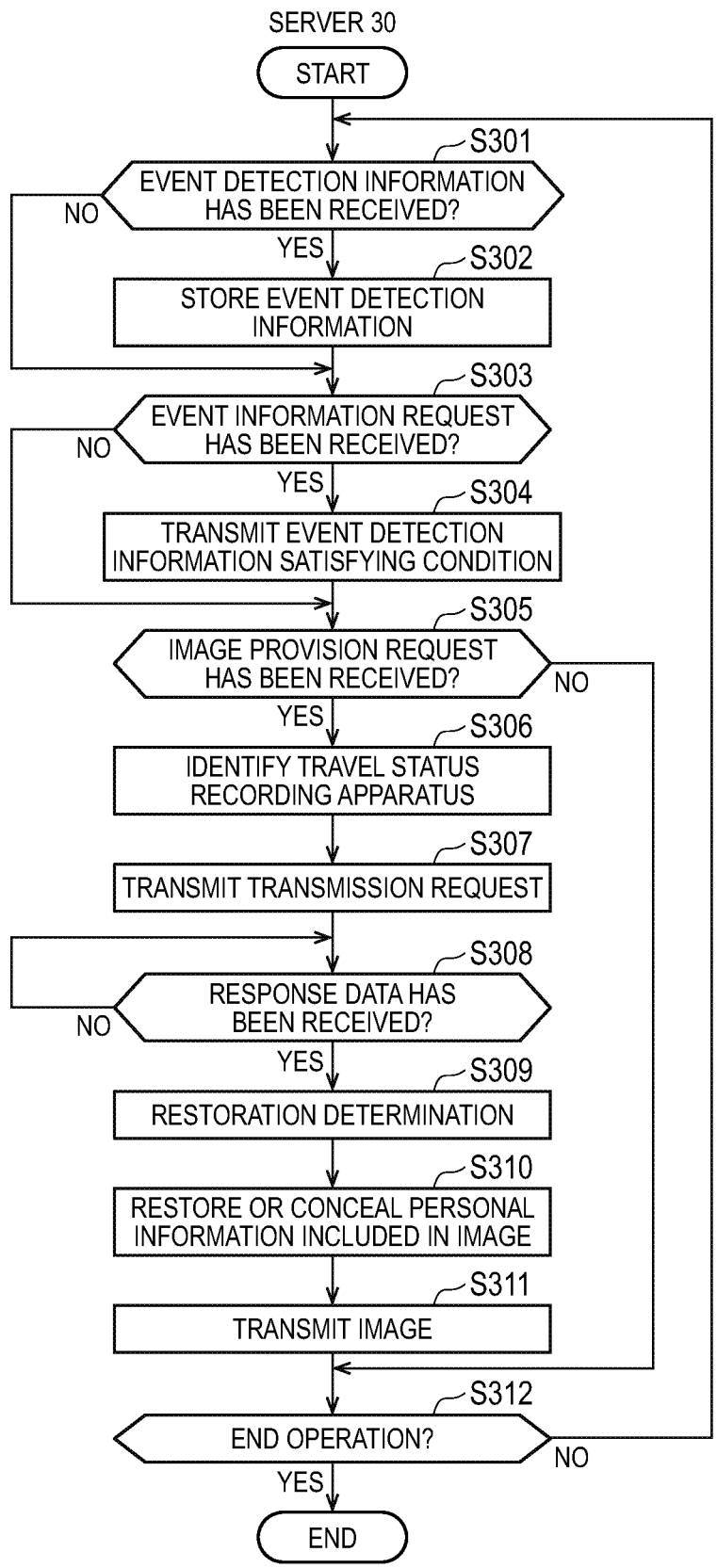
FIG. 8 is a flowchart showing operation of the server shown in FIG. 1.

FIG. 8 is a flowchart showing operation of the server 30 shown in FIG. 1. With reference to FIG. 8, when a power is turned on, the server 30 starts processing shown in FIG. 8.

In the server 30, it is determined whether the acquisition unit 33 has received the event detection information 21 from the travel status recording apparatus 10 (step S301). If the acquisition unit 33 has not received the event detection information 21 (No in step S301), the server 30 proceeds to step S303 (described later). When the acquisition unit 33 has received the event detection information 21 (Yes in step S301), the recording control unit 15 stores the event detection information 21 received by the acquisition unit 33 in the event DB 371 (step S302).

Next, it is determined whether the event information provision unit 36 has received the event information request 63 from the PC 40 (step S303). When the event information provision unit 36 has not received the event information request 63 (No in step S303), the server 30 proceeds to step S305 (described later).

When the event information provision unit 36 has received the event information request 63 (Yes in step S303), the event information provision unit 36 transmits the event detection information 21 that satisfies a condition designated in the event information request 63 to the PC 40 (step S304). For example, it is assumed that the road administrator who operates the PC 40 checks a travel status of a vehicle at the frequent occurrence point of sudden deceleration. In this case, the PC 40 transmits, to the server 30, the event information request 63 including position information of the frequent occurrence point of sudden deceleration and a time zone designated by the road administrator in response to operation of the road administrator. The event information provision unit 36 searches the event DB 371 to identify the event detection information 21 corresponding to the position information and the time zone that are included in the event request information 63. The event information provision unit 36 transmits the identified event detection information 21 to the PC 40.

It is determined that whether the image provision unit 31 has received the image provision request 41 from the PC 40 (step S305). If the image provision unit 31 has not received the image provision request 41 from the PC 40 (No in step S305), the server 30 proceeds to step S312 (described later).

When the image provision unit 31 has received the image provision request 41 from the PC 40 (Yes in step S305), the image provision unit 31 identifies the travel status recording apparatus 10 based on the received image provision request 41 (step S306). Specifically, the image provision request 41 includes the device ID. The device ID included in the image provision request 41 indicates the travel status recording apparatus 10 that has generated an image requested to be provided by the PC 40, and is derived from the event detection information 21 transmitted to the PC 40 in step S304. The image provision unit 31 extracts the device ID from the image provision request 41, and identifies the travel status recording apparatus 10 based on the extracted device ID.

The image provision unit 31 generates the transmission request 28 based on the received image provision request 41, and transmits the generated transmission request 28 to the travel status recording apparatus 10 identified in step S306 (step S307). The transmission request 28 includes the event ID included in the image provision request 41. As will be described later, the travel status recording apparatus 10 identifies an image to be transmitted to the server 30 based on the event ID included in the transmission request 28. The event ID included in the image provision request 41 is derived from the event detection information 21 transmitted to the PC 40 in step S304.

After step S307, the server 30 waits until the response data 29 is received from the travel status recording apparatus 10 (Yes in step S308).

When receiving the response data 29 from the travel status recording apparatus 10 (Yes in step S308), the acquisition unit 33 outputs the masked vehicle interior image 4B and the masked front image 5B that are included in the received response data 29 to the image provision unit 31 and the restoration determination unit 34.

The restoration determination unit 34 determines whether to restore the personal information included in each of the masked vehicle interior image 4B and the masked front image 4A that are received from the acquisition unit 33 (step S309). Specifically, the restoration determination unit 34 refers to a restoration determination table 39 shown in FIG. 9 so as to determine whether to restore the personal information.

With reference to FIG. 9, the restoration determination table 39 records restoration setting information indicating whether to restore the personal information included in the vehicle interior image and the front image. Records of one row in FIG. 9 are restoration setting information. The restoration determination table 39 records not only restoration setting information of the travel status recording apparatus 10 but also restoration setting information of another apparatus having the same configuration as the travel status recording apparatus 10.

The owner of the vehicle 1 on which the travel status recording apparatus 10 is mounted may select whether to publish the personal information included in the vehicle interior image. The server 30 records a selection result of the owner of the vehicle 1 in the restoration determination table 39 in advance. As shown in FIG. 9, restoration of the personal information included in the vehicle interior image is recorded in a record of the travel status recording apparatus 10.

As shown in FIG. 9, the personal information included in the front image is entirely concealed. This is because it is not realistic to ask an owner of the personal information included in the front image in advance whether to publish the personal information.

A record of a management ID "1" is the restoration setting information of the travel status recording apparatus 10. The restoration determination unit 34 determines to restore the personal information that is included in the masked vehicle interior image 4B received from the travel status recording apparatus 10 according to the restoration determination table 39 shown in FIG. 9. The restoration determination unit 34 determines to conceal the personal information that is included in the masked front image 5B received from the travel status recording apparatus 10. The restoration determination unit 34 outputs determination information 42 indicating whether to restore each of the masked images to the image provision unit 31.

With reference to FIG. 8, the image provision unit 31 restores or conceals the personal information that is included in the masked image received from the acquisition unit 33 based on the determination information 42 received from the restoration determination unit 34 (step S310). As a result of step S310, the restored image 61 and the concealed image 62 are generated.

As described above, it is assumed that the restoration determination unit 34 determines to restore the personal information included in the masked vehicle interior image 4B and to conceal the personal information included in the masked front image 5B. In this case, the image provision unit 31 restores the personal information included in the masked vehicle interior image 4B by deleting the mask layer from the masked vehicle interior image 4B. As a result, the restored image 61 is generated from the masked vehicle interior image 4B. The image provision unit 31 integrates the front image 5A included in the masked front image 5B and the mask layer to generate one image, thereby concealing the personal information included in the masked front image 5B. Accordingly, the concealed image 62 in which the personal information included in the masked front image 5B is concealed is generated.

The image provision unit 31 transmits the restored image 61 and the concealed image 62 that are generated in step S310 to the PC 40 (step S311). The server 30 determines whether to end the operation (step S312). When repeating the processing shown in FIG. 8 (No in step S312), the server 30 returns to step S301. When ending the operation (Yes in step S312), the server 30 ends the processing shown in FIG. 8.

As described above, when the travel status recording apparatus 10 acquires an image captured by the camera mounted on the vehicle 1, the server 30 masks the personal information included in the acquired captured image to generate the masked image. When the third party requests acquisition of an image captured by the camera mounted on the vehicle 1, the server 30 acquires the masked image from the travel status recording apparatus 10, and restores or conceals the personal information included in the acquired masked image based on the preset restoration setting information. Accordingly, the image recording system 100 may disclose a captured image recorded by a drive recorder to the third party.

[Modification]

In the above-described embodiment, an example has been described in which the road administrator operates the PC 40. However, the present invention is not limited thereto. A third party unrelated to the owner of the vehicle 1 may operate the PC 40.

In the above-described embodiment, an example has been described in which the PC 40 transmits the image provision request 41 to the server 30 based on the event detection information 21 acquired from the server 30. However, the present invention is not limited thereto. The PC 40 may transmit a condition of an image that is requested to be provided to the server 30. For example, the PC 40 may transmit an image capturing position and an image capturing time of an image, a type of an event, and the like to the server 30 to request the server 30 to provide the image.

In the above-described embodiment, an example has been described in which the event detection unit 12 detects sudden deceleration of the vehicle 1 and a falling object as an event. However, the present invention is not limited thereto. The event detection unit 12 may detect an event that occurs at the vehicle 1 based on information from a device mounted on the vehicle 1.

In the above-described embodiment, an example has been described in which the mask unit 14 masks the personal information included in a captured image using the mask layer. However, the present invention is not limited thereto. The mask unit 14 may encrypt an image of a region designated by the region information 24 or 25. In this case, the mask unit 14 uses an algorithm that may restore the encrypted image.

In the above-described embodiment, functional blocks of the travel status recording apparatus 10 and the server 30 may be individually formed into one chip by a semiconductor device which is an LSI or the like, or may be formed into one chip so as to include a part or all of the functional blocks. The name used here is LSI, but it may also be referred to as an IC, a system LSI, a super LSI, or an ultra LSI depending on a degree of integration.

A method of circuit integration is not limited to the LSI, and may be implemented by a dedicated circuit or a general-purpose processor. After the LSI is manufactured, a field programmable gate array (FPGA) that may be programmed or a reconfigurable processor that may reconfigure a connection and a setting of circuit cells in the LSI may be used.

A part or all of processing executed by the travel status recording apparatus 10 and the server 30 may be implemented by a program. Then, a part or all of the processing of functional blocks according to the above-described embodiment is executed by a central processing unit (CPU) in a computer. A program for performing each piece of processing is stored in a storage device which is a hard disk, a ROM, or the like, and is read out and executed in the ROM or a RAM.

Each piece of the processing according to the above-described embodiment may be implemented by hardware, or may be implemented by software (including a case in which the processing is implemented together with an operating system (OS), middleware, or a predetermined library). Further, the processing may be implemented by a combination of software and hardware.

Figure 10:
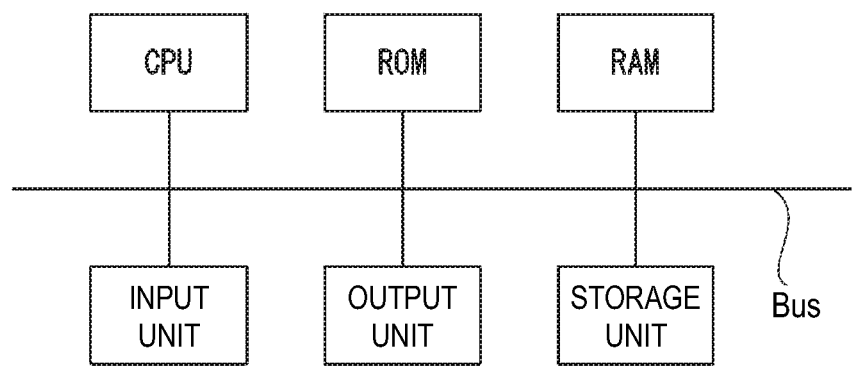
FIG. 10 shows a configuration of a CPU bus.

For example, in a case in which each functional block of the travel status recording apparatus 10 and the server 30 is implemented by software, each functional unit may be implemented by software processing using a hardware configuration (a hardware configuration in which a CPU, a ROM, a RAM, an input unit, an output unit, and the like are connected by a Bus) shown in FIG. 10.

Order of execution of the processing method according to the above-described embodiment is not limited to the description of the above-described embodiment, and the order of execution may be changed without departing from the scope of the invention.

A computer program for causing a computer to execute the above-described method and a computer-readable recording medium storing the program are included in the scope of the present invention. Here, examples of the computer-readable recording medium include a flexible disk, a hard disk, a CD-ROM, a MO, a DVD, a DVD-ROM, a DVD-RAM, a large-capacity DVD, a next-generation DVD and a semiconductor memory.

Although the embodiment of the present invention has been described above, the above-described embodiment is merely an example for implementing the present invention. Therefore, the present invention is not limited to the above-described embodiment, and may be implemented by appropriately modifying the above-described embodiment without departing from the scope of the invention.

What is claimed is:

1. An image recording system comprising:
    a travel status recording apparatus including a storage that records an image that is captured by at least one camera mounted on a vehicle, the travel status recording apparatus including at least one processor programmed to:
        identify personal information included in the captured image; and
        in response to the personal information in the captured image being identified, mask the personal information in the captured image in a restorable manner; and
    a server configured to communicate with the travel status recording apparatus via a network, the server including at least one processor programmed to:
        acquire a masked image from the travel status recording apparatus, the masked image corresponding to the captured image in which the personal information is masked;
        determine, in response to a request for the masked image acquired from a third party, whether to restore the personal information included in the acquired masked image based on a preset restoration level;
        in response to a determination to restore the personal information, restore the personal information included in the acquired masked image, and provide the third party with a masked image in which the personal information is restored; and
        in response to a determination not to restore the personal information, conceal the personal information included in the acquired masked image such that the personal information included in the acquired masked image cannot be restored, and provide the third party with a masked image in which the personal information is concealed,
    wherein the at least one camera includes a front camera configured to capture an image of a scene in front of the vehicle, and a vehicle interior camera configured to capture an image of a vehicle interior of the vehicle,
    the at least one processor of the server determines not to restore the personal information included in the acquired masked image generated by the front camera, and
    the at least one processor of the server determines whether to restore the personal information included in the acquired masked image generated by the vehicle interior camera based on presence or absence of approval by an owner of the vehicle.

2. The image recording system according to claim 1, wherein the at least one processor of the server determines whether to restore the personal information included in the acquired mask image based on a selection, of an owner of the personal information included in the acquired mask image, whether to publish the personal information included in the acquired mask image recorded in advance in a case where the acquired mask image is the image of the vehicle interior captured by the vehicle interior camera.

\* \* \* \* \*